May 5, 1964
R. M. MULLER ETAL
3,132,200
MICROSCOPE OPTICAL SYSTEM
Filed June 5, 1961
4 Sheets-Sheet 2
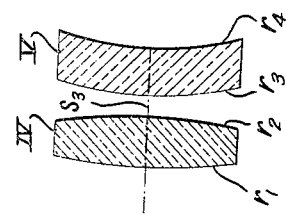
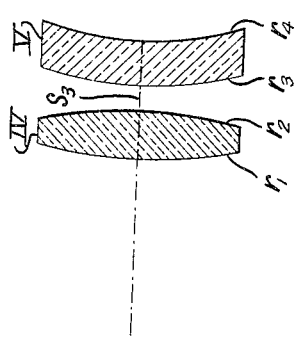
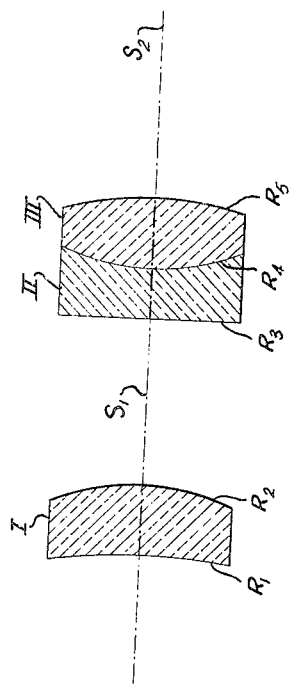
*Fig. 2*
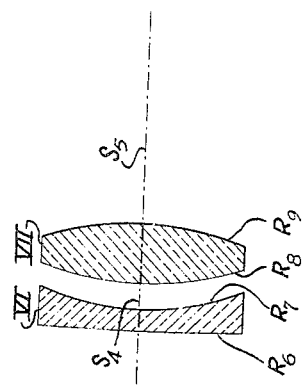
*Fig. 3*
INVENTOR.
ROBERT M. MULLER &
MILTON H. SUSSMAN
BY
*Beau, Brooks, Buckley & Beau.*

May 5, 1964     R. M. MULLER ETAL     3,132,200
MICROSCOPE OPTICAL SYSTEM

Filed June 5, 1961     4 Sheets-Sheet 4

---- 4861A° = F
—— 5893A° = D
—·— 6563A° = C

H'
IMAGE HEIGHT IN
FINAL IMAGE PLANE

TAN θ' (FINAL ANGLE)

---- 4861A° = F
—— 5893A° = D
—·— 6563A° = C

H'
IMAGE HEIGHT IN
FINAL IMAGE PLANE

TAN θ' (FINAL ANGLE)

INVENTOR.
ROBERT M. MULLER &
MILTON H. SUSSMAN
BY
Beau, Brooks, Buckley & Beau.

United States Patent Office 3,132,200
Patented May 5, 1964

3,132,200
MICROSCOPE OPTICAL SYSTEM
Robert M. Muller, Cheektowaga, and Milton H. Sussman, Buffalo, N.Y., assignors to American Optical Company, Southbridge, Mass.
Filed June 5, 1961, Ser. No. 114,694
23 Claims. (Cl. 88—57)

This invention relates to optical systems and pertains more particularly to an improved system for microscopes.

In ordinary compound microscopes, the optical system comprises an objective and an eye piece in which the objective images the object upon which it is focused in the focal plane of the eye piece. With this system, the manner in which the object is placed in focus may be accomplished either by moving the stage of the microscope toward and away from the objective which remains fixed or the tube to which the objective and eye piece are fixed is moved as a unit toward and away from a stage. This gives rise to certain mechanical disadvantages. For example, accidental striking of the tube or the stage very readily occurs and damage to the adjusting mechanism may easily take place. Or the same situation prevails should the microscope be tipped over or dropped. There are other considerations of a mechanical nature also as for example the construction of the mechanism by which the coarse and fine adjustments are made but these are of no import insofar as the optical system in accordance with the present invention is concerned. The optical system in accordance with the present invention is so constructed that the microscope structure can be made with both the stage and the tube fixed, and thus they may be integrated as a sturdy and rigid unit. The focusing of the optical system of the present invention is accomplished by moving the objective alone. This accrues certain advantages of a structural nature as for example in permitting of a more refined adjusting mechanism and it also renders the microscope much less subject to damage since the movable part, the objective, is in a physical position such that it is not easily struck accidentally even should the microscope be tipped over or dropped. This is true even if a multiple objective nose piece is used. It is therefore of primary concern in connection with the present invention to provide an optical system wherein the objective alone to the exclusion of a tube to which the eye piece is attached and of the stage, is movable for purposes of focusing.

More particularly, an object of the present invention is to provide an optical system for microscopes in which the movable microscope objective images the object upon which it is focused at infinity and wherein the tube of the microscope fixedly carries what will hereinafter be termed a telescope objective whose function is to focus the image of the object in the focal plane of the eye piece which is also rigidly carried by the tube.

Bearing the above in mind, it will be appreciated that in addition to obtaining advantages inherent in the novel system as set forth above, it is also of primary concern to provide a system, as above, in which the number of lens elements used is maintained at a practical minimum in order to provide for good economy of construction. This is particularly true wherein the microscope is to be of the type utilizing a nosepiece carrying a plurality of microscope objectives. For instance, in the system disclosed herein, it is specifically contemplated to provide a combination of microscope objectives having the powers and numerical apertures generally in accordance with those values which have been more or less standard in the field, and to do so in an economical fashion. That is to say, not only is the eyepiece permitted to be of standard construction separate and apart from the remainder of the system, but also the telescope objective is used in common with all of the various microscope objectives.

A further object of this invention resides in a system as aforesaid which is well corrected for all aberrations.

A further main objective of the present invention resides in the combination of a microscope objective and a telescope objective in which certain aberrations are deliberately introduced into the telescope objective to correct aberrations inherent in the microscope objective and wherein these deliberately introduced aberrations of the telescope objective are corrected by corresponding aberrations deliberately introduced in the microscope objective.

A further object of this invention is to provide an improved optical system for a microscope generally in accordance with the preceding objects wherein, by virtue of the characteristic of the microscope objective imaging the object at infinity, the telescope objective may be physically spaced therefrom as to permit relatively small aberrational changes to be made in the telescope objective which will correct relatively much greater aberrational characteristics of the microscope objective.

More specifically, the above object is accomplished by virtue of the fact that the aperture stop of the optical system is in the vicinity of the microscope objective so that a small amount of undercorrection of axial color in the telescope objective will introduce sufficient undercorrection for lateral color in the telescope objective to compensate for the lateral color present in the microscope objective whereas at the same time, the small amount of undercorrection of axial color deliberately introduced in the telescope objective may be restored by corresponding overcorrection for axial color in the microscope objective without producing appreciable change in the lateral color contribution of the microscope objective. Further, the inherent tangential curvature of field in the microscope objective can be corrected, while holding the coma, by introducing undercorrection of spherical aberration in the telescope objective and restoration of the spherical aberration thus introduced may be accomplished by bending the components of the microscope objective while effecting little change in the tangential curvature of field and coma of the system.

Consequently, it is a further object of this invention to provide a system of the character described in which the telescope objective is characterized by undercorrection for axial color and undercorrection of spherical aberration which, as aforesaid, compensate for the inherent aberrational characteristics of microscope objectives.

These and further objects and features of the invention will become more apparent from the following description and the accompanying drawings wherein;

FIG. 2 is a view showing a microscope objective-telescope objective combination in accordance with this invention;

FIGS. 3–5 are views similar to FIG. 2 but showing different microscope objectives;

Figure 8:
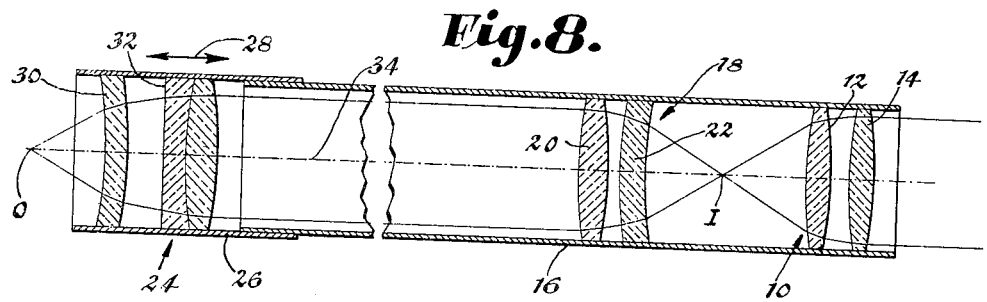
Figure 6:
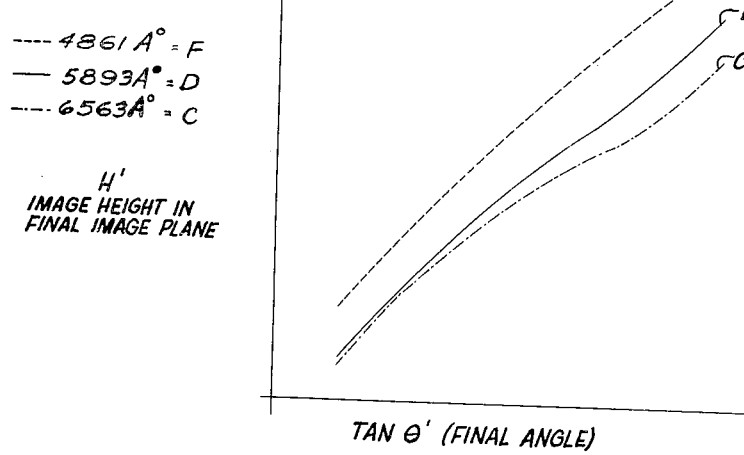
FIG. 6 is a graph showing the aberration characteristics of a system in accordance with the present invention utilizing an aberrationless telescope objective.
Figure 7:
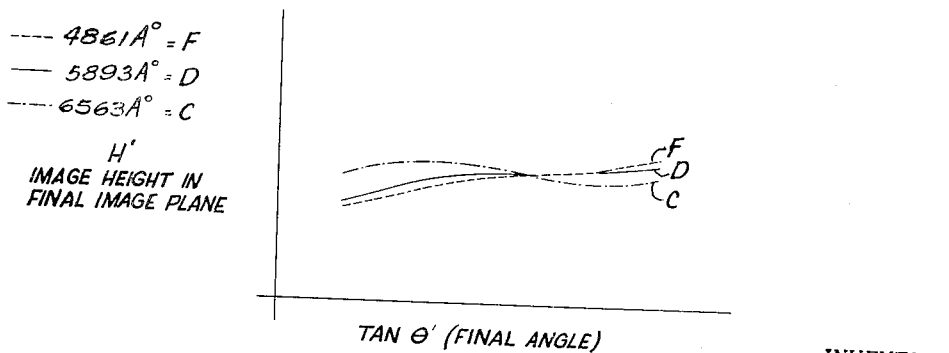

FIG. 7 is a graph similar to FIG. 6 but showing the aberration characteristics in accordance with a telescope objective having the controlled aberrational characteristics in accordance with this invention; and FIG. 8 is a diagrammatic view illustrating an optical system in accordance with the present invention and showing the manner in which the microscope objective is movable to effect focusing of the system.

Referring at this time more particularly to FIG. 8, the system shown therein comprises an eye piece indicated generally by the reference character 10 which, for the purpose of clarity only since the eye piece per se forms no part of the present invention, is shown as consisting of two positive lenses 12 and 14. This eye piece combination is rigidly mounted in the microscope tube 16. Also fixed within the tube 16 is a telescope objective indicated generally by the reference character 18 and which is constructed in accordance with the principles of this invention and will be seen to consist of a slightly separated doublet comprising a positive lens 20 and a negative lens 22. Suitably mounted on the far end of the tube 16, that is remote from the eye piece 10, is a microscope objective indicated generally by the reference character 24. The specific manner in which this microscope objective is mounted for motion relative to the tube 16 forms no part of the present invention and for the sake of simplicity a simple sliding fit between the tube 16 and the surrounding microscope objective tube 26 is shown, so as to permit motion of the microscope objective as indicated by the arrows 28.

The microscope objective 24 in the particular instance shown in FIG. 8 incorporates a single positive lens 30 and a cemented doublet indicated generally by the reference character 32. The optical axis of the system is as designated by reference character 34 and in the position of adjustment of the microscope objective 24 the same is focused upon object at point O and, as can be seen by the diagrammatic tracings therefrom, this object is imaged at infinity by the microscope objective. The point I at which the object is imaged by the combination of the microscope objective 24 and the telescope objective 18 lies in the focal plane of the eye piece 10 so that the object is viewed by the eye at infinity.

If the system as shown in FIG. 8 is designed utilizing an aberrationless objective 18, the microscope objective 24 will require at least 4 elements in order to obtain a good image, substantially free of aberrations. With a three element microscope objective, as in FIG. 1, the same will be overcorrected for lateral color and undercorrected for tangential curvature of field. Consequently, a poor image out in the field will result from a combination of such microscope objective and an aberrationless telescope objective. A typical graph of the aberration of such a system is shown in FIG. 6. However, it was discovered that by introducing certain aberrational characteristics in the telescope objective 18, a three element microscope objective 24 could be employed while obtaining a good image out in the field. The graph of the aberrational characteristics of such a system is shown in FIG. 7 and comparison of this figure with the graph of FIG. 6 will immediately establish the superiority of the system wherein aberrations are deliberately introduced into the telescope objective.

According to the present invention, it was discovered that by physically displacing the telescope objective 18 sufficiently far from the microscope objective whereat the aperture stop for the system is located, characteristics such as are depicted in FIG. 7 may be obtained. By spacing the telescope objective relatively far from the microscope objective, a small change in axial aberrations of the telescope objective will produce a relatively large change in field aberrations which would be inherent in a three element microscope objective as is shown in FIG. 8. At the same time, due to the mentioned aperture stop position, a small change in axial aberrations in the microscope objective will produce only a small change in field aberrations. Therefore, the axial aberration introduced in the telescope objective to compensate the relatively large field aberrations inherent in the microscope objective may be restored by introducing axial aberration, opposite in sign, in the microscope objective, with only a small corresponding change in field aberration.

In the system according to the present invention, the use of the telescope objective, aside from permitting of focusing adjustments by movement of the microscope objective alone, permits the low power microscope objectives, particularly the 10× microscope objective, to be made from fewer lens components than would be possible otherwise. Thus, without the use of a telescope objective as aforesaid, the 10× objective would require at least four lens elements to obtain as good image characteristics out in the field as does the present three-element microscope objective and telescope objective combination. However, a further advantage accrues in accordance with the use of the telescope objective. This further advantage has to do with improvement of the image when the more conventional high power microscope objectives are used. That is to say, it is possible, with the present system, to make minor modifications in an existing high power objective so as to image an object at infinity, and this modified objective, when then used as a microscope objective in the present system, will produce a better image than would such objective, unmodified, when used in a conventional system, that is with an eye piece alone. This gives rise to greater latitude in selection of combinations within the optical system.

For example, comparing a microscope for student use and one for more exacting use, as for example a laboratory microscope, both may incorporate a standard eyepiece-telescope objective combination while altering only the microscope objectives used. However, both may use the same 10× microscope objective. Thus, these two features permit, through greater standardization, economical saving in both types of microscopes. Then, for a student microscope, the microscope objective of intermediate power, which may be the highest power desired for this type, may be constructed of fewer lens components than would be permitted by a conventional system. However, for the better quality microscope, the higher power microscope objectives used are preferably of no less number of lens elements than would normally be used as the objective in a conventional system. In this way, since conventional high power objectives are inherently affected with field aberrations which the telescope objective of the present invention also tends to correct, their use in the present system, when corrected as above to image at infinity, produces a better image than do these same objectives when conventionally used.

Referring now more particularly to FIG. 2, the microscope-telescope objective combination as shown therein consists of the lens elements I, II, III, IV, and V of which lenses I, II and III form the microscope objective and lenses IV and V form the telescope objective, to be used in a system such as is diagrammatically illustrated in FIG. 8.

In Table 1 below, the constants for a 10×, N.A. .25 microscope objective together with the telescope objective used in common with all of the microscope objectives in the system herein disclosed is shown. In this table, the equivalent focal length of the microscope objective is 16.0 mm., the equivalent focal length of the telescope objective is 165.2 mm., $n_D$ is the refractive index of the glass used in each case, $v$ is the Abbe number of the glass in each case and the reference characters are as indicated in FIG. 2.

Table 1

| Lens | $n_D$ | $v$ | Radii | Thickness and Distance |
|---|---|---|---|---|
| I | 1.617 | 54.9 | $R_1 = -120.296$ | $t_1 = 3.15$ |
|  |  |  | $R_2 = -11.90$ | $s_1 = 7.533$ |
| II | 1.720 | 29.3 | $R_3 = +241.185$ | $t_2 = 2.60$ |
| III | 1.617 | 54.9 | $R_4 = +10.85$ | $t_3 = 3.50$ |
|  |  |  | $R_5 = -15.911$ | $s_2 = 100.7$ Variable |
| IV | 1.5725 | 57.4 | $r_1 = +112.702$ | $t_4 = 2.53$ |
|  |  |  | $r_2 = -72.305$ | $s_3 = .258$ |
| V | 1.5795 | 41.0 | $r_3 = +44.201$ | $t_5 = 2.37$ |
|  |  |  | $r_4 = +27.735$ |  |

Specifically, compensation for the lateral color contribution of this three element 10× microscope objective was accomplished by introducing undercorrected axial color in the telescope objective and the axial color of the system was then restored by introducing corresponding axial color overcorrection in the microscope objective doublet. As set forth above, the compensating axial color overcorrection in the microscope objective is made with insignificant change in lateral color.

In compensating the undercorrected tangential curvature of field of the microscope objective, the requisite undercorrection for spherical aberration in the telescope objective was obtained, while holding the coma substantially zero, by utilizing the two shape factors of a slightly separated doublet. This spherical aberration of the system, introduced to compensate for the inherent tangential curvature of field of the microscope objective, was restored while holding the coma, by bending the components of the microscope objective without changing the tangential curvature of field significantly.

In Table 2 below are given the constants for a 40× microscope objective of the three-element type shown in FIG. 2 to be used with the telescope objective of Table 1.

Table 2

| Lens | $n_D$ | $v$ | Radii | Thickness and Distance |
|---|---|---|---|---|
| I | 1.617 | 54.9 | $R_1 = \infty$ | $t_1 = 3.40$ |
|  |  |  | $R_2 = -2.98$ | $s_1 = .63$ |
| II | 1.7506 | 27.8 | $R_3 = +19.01$ | $t_2 = .81$ |
| III | 1.6109 | 57.2 | $R_4 = +3.52$ | $t_3 = 2.58$ |
|  |  |  | $R_5 = -6.61$ | $s_2 = 117.057$ Variable |

This particular microscope objective is particularly useful as a higher power objective for use with a student microscope in combination with the microscope objective of Table 1.

Figure 4:
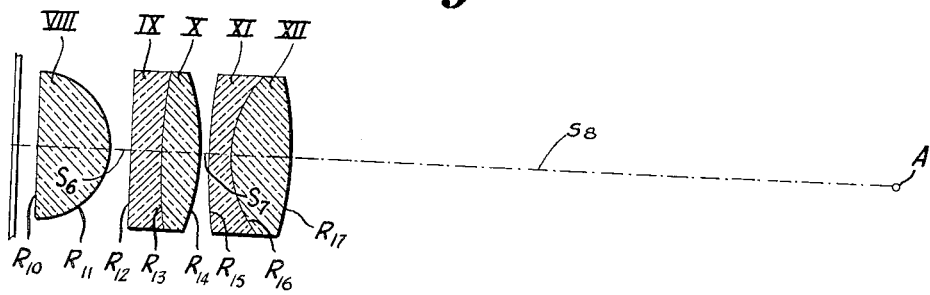

A microscope objective of similar power but of greater Numerical Aperture, useful in a more exacting microscope may be made in accordance with Table 3 below. This table refers to FIG. 4 and the point A therein represents the front surface of lens IV of the telescope objective.

Table 3

| Lens | $n_D$ | $v$ | Radii | Thickness and Distance |
|---|---|---|---|---|
| VIII | 1.5725 | 57.4 | $R_{10} = \infty$ | $t_8 = 2.750$ |
|  |  |  | $R_{11} = -2.85$ | $s_6 = .956$ |
| IX | 1.5795 | 41.0 | $R_{12} = \infty$ | $t_9 = 1.00$ |
| X | 1.511 | 63.5 | $R_{13} = +12.83$ | $t_{10} = 1.51$ |
|  |  |  | $R_{14} = -6.23$ | $s_7 = .084$ |
| XI | 1.720 | 29.3 | $R_{15} = +14.07$ | $t_{11} = .98$ |
| XII | 1.5170 | 64.5 | $R_{16} = +4.30$ | $t_{12} = 2.31$ |
|  |  |  | $R_{17} = -13.31$ | $s_8 = 114.981$ Variable |

This 43× objective has a Numerical Aperture of 0.66 and is similar to a conventional objective except that it images at infinity for use in the present system.

Figure 5:
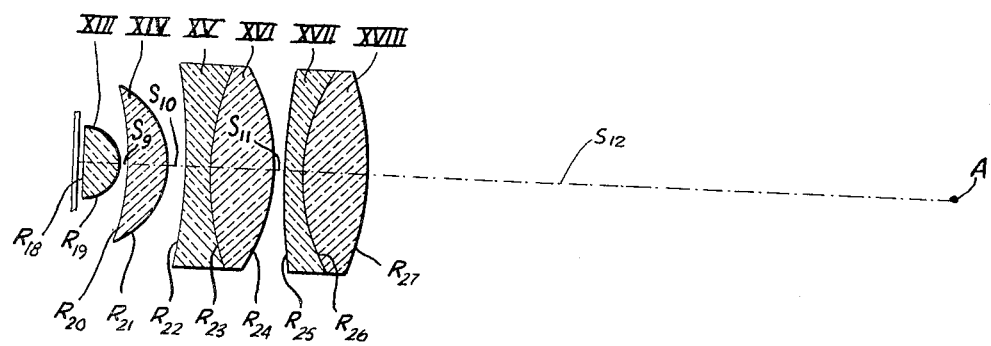

A further example of a high power objective for use with better quality microscopes is illustrated in Table 4. This microscope objective is shown in FIG. 5 and is of the oil immersion type having a Numerical Aperture of 1.25. It is similar in purpose and derivation to the microscope objective of FIG. 4.

Table 4

| Lens | $n_D$ | $v$ | Radii | Thickness and Distance |
|---|---|---|---|---|
| XIII | 1.5170 | 64.5 | $R_{18} = \infty$ | $t_{13} = .98$ |
|  |  |  | $R_{19} = -.816$ | $s_9 = .02$ |
| XIV | 1.5110 | 63.5 | $R_{20} = -8.16$ | $t_{14} = 1.00$ |
|  |  |  | $R_{21} = -2.04$ | $s_{10} = .382$ |
| XV | 1.6490 | 33.8 | $R_{22} = -26.28$ | $t_{15} = .69$ |
| XVI | 1.5110 | 63.5 | $R_{23} = +5.98$ | $t_{16} = 1.54$ |
|  |  |  | $R_{24} = -3.78$ | $s_{11} = .132$ |
| XVII | 1.720 | 29.3 | $R_{25} = +88.71$ | $t_{17} = .55$ |
| XVIII | 1.5110 | 63.5 | $R_{26} = +4.516$ | $t_{18} = 1.60$ |
|  |  |  | $R_{27} = -8.165$ | $s_{12} = 118.2$ Variable |

A low power scanning 4× microscope objective for use in the system is set forth in Table 5, referring to FIG. 3.

Table 5

| Lens | $n_D$ | $v$ | Radii | Thickness and Distance |
|---|---|---|---|---|
| VI | 1.649 | 33.8 | $R_6 = +254.0$ | $t_6 = 1.0$ |
|  |  |  | $R_7 = +12.570$ | $s_4 = 1.25$ |
| VII | 1.517 | 64.5 | $R_8 = +14.97$ | $t_7 = 3.0$ |
|  |  |  | $R_9 = -14.97$ | $s_5 = 86.880$ Variable |

Since a 10× microscope objective is a fundamental objective used on most microscopes and finds wide usage in many applications, the specific system set forth above in Tables 1–5 inclusive represents a system which has been optimized for this particular objective. That is to say, the combination of telescope-microscope objectives according to this invention gives rise to results which are optimum for the particular microscope objective for which the telescope objective is specifically adapted and, for the other microscope objectives of the system it will be understood that while improvement is present, optimum conditions will not prevail. However, in a system of this sort, it appears best to produce optimum characteristics in connection with that microscope objective which finds widest utility and for which the optimum conditions are most beneficial. Thus, since a relatively large field portion is normally observed and studied with the 10× objective, the benefits of the present system are pronounced with this particular objective. Then too, the lesser effects noted with the higher power objectives are not so critical inasmuch as a relatively small central field portion will be studied therewith.

Nevertheless, it will be understood that the principles of the present invention may be employed to produce optimum characteristics with any particular microscope objective chosen, whether the same be of high or low power.

Figure 1:
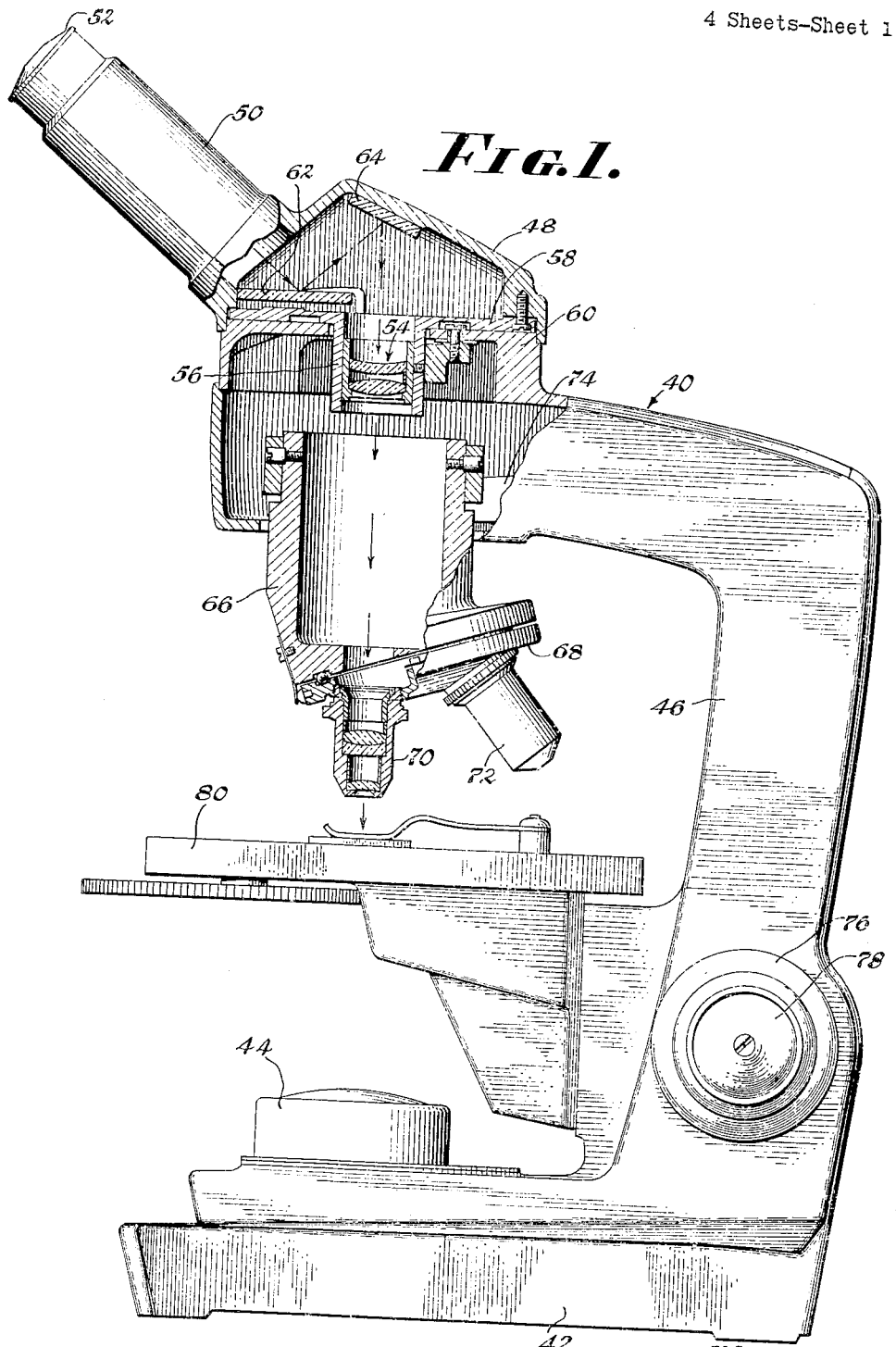
FIG. 1 is an elevational view of a microscope embodying the principles of the present invention, portions thereof being broken away to illustrate the optical system employed.

To illustrate a practical embodiment of the present invention, reference will be had at this time to FIG. 1. As shown, the microscope 40 includes a base 42 housing a suitable illuminator 44 or the like. An arm 46 extends in integral or otherwise rigidly mounted relation from the base 42 and in turn rigidly mounted on the upper end of the arm is a housing 48 with which the eyepiece tube 50 is integral. A removable eyepiece 52 is releasably fixed within the tube.

The telescope objective 54 of the system is rigidly fixed within the depending cylindrical portion 56 of plate 58 supported upon and fixed to the pedestal portion 60 of arm 46. Supported on plate 58 and on the roof of the housing 48 are two mirrors 62 and 64 whose locations relative to the eyepiece and telescope objective is effective to establish these two components on the optical axis represented by the arrows in FIG. 1.

The portion of the microscope which is movable for focusing purposes is the nosepiece 66 including the rotatable head portion 68 which mounts a pair or more of microscope objectives 70 and 72, as desired. The head 68 may be rotated to bring any selected one of the microscope objectives into alignment with the optical axis of the system.

Although forming no part of the present invention, the arm 46 houses a boomerang shaped lever 74 pivoted between its ends therewithin with its upper end supporting the nosepiece 66 and its lower end engaging a coarse and fine adjustment mechanism controlled by hand knobs 76 and 78. Thus, vertical motion for focusing purposes may be imparted to the nosepiece to move the same toward and away from the stage 80.

To further illustrate the principles of the present invention, a modified form of telescope objective is represented in the following table, having reference to FIG. 2 and employing measurements as explained in conjunction with Table 1:

*Table 6*

| Lens | $n_D$ | $v$ | Radii | Thickness and Distance |
|---|---|---|---|---|
| IV | 1.5725 | 57.4 | $r_1=+87.484$ | $t_4=2.30$ |
|    |        |      | $r_2=-163.931$ | $s_3=.250$ |
| V  | 1.5795 | 41.0 | $r_3=+45.250$ | $t_5=2.30$ |
|    |        |      | $r_4=+32.204$ |            |

In this particular telescope objective, undercorrected axial color is introduced to compensate the inherent overcorrected lateral color of an associated microscope objective, whereas a requisite amount of coma is introduced in the telescope objective, while holding the spherical aberration thereof practically zero, to compensate the inherent undercorrected tangential curvature of field of the microscope objective. Thus the principle of the telescope objectives of Tables 1 and 6 is the same although they differ in specific manner of application.

That is, the telescope objective of Table 1 (lenses IV and V) accomplishes compensation for inherent tangential curvature of field in the microscope objective by the introduction (in the telescope objective) of spherical aberration while holding the coma of the telescope objective substantially zero. In the telescope objective of Table 6, the reverse is true, coma is introduced in the telescope objective while holding the spherical aberration substantially zero. Of course, variations between these two methods may be employed by introducing both coma and spherical aberration in the telescope objective.

In any case, aside from the selection of various glasses, the shape factors of the lenses involved are controlling, shape factor being defined as the ratio $$\frac{r_2+r_1}{r_2-r_1}$$

In the telescope objective of Table 1, the shape factor of lens IV equals $-.218$ while the shape factor of lens V equals $-4.369$. In the telescope objective of Table 6, the shape factor of lens IV equals $+.304$ while the shape factor of lens V equals $-5.937$. Between the two extremes specifically disclosed, that is holding the coma substantially zero while varying the spherical aberration and vice versa, as a general condition for a telescope objective according to this invention, for the front lens, the shape factor $$\frac{r_2+r_1}{r_2-r_1}$$

may be in the range of about $-.2$ to $+.4$ whereas for the other lens, the shape factor may be in the range of about $-4$ to about $-6$.

The telescope objective of Table 6, it will be understood, is not intended for use with the microscope objectives specifically tabulated. Rather, this telescope objective is for use in more exacting systems and is of greater focal length in order to obtain greater magnification.

We claim:

1. An optical system for microscopes comprising an eyepiece, a microscope objective aligned with said eyepiece to image an object toward the eyepiece, and a telescope objective interposed between the microscope objective and the eyepiece to focus the image in the focal plane of the latter said telescope objective and said eyepiece being fixed relative to each other and said microscope objective being movable relative thereto for focusing the system upon an object, said microscope objective comprising a single positive lens I followed by a cemented doublet II, III spaced therefrom according to the following in which $n_D$ is the index of refraction, $v$ is the abbe number and $s$ represents the distance between lenses I and II in millimeters, the radii and thicknesses being indicated in millimeters:

| Lens | $n_D$ | $v$ | Radii | Thickness and Distance |
|---|---|---|---|---|
| I | 1.617 | 54.9 | $R_1=-120.296$ | $t=3.15$ |
|   |       |      | $R_2=-11.90$   | $s=7.533$ |
| II | 1.720 | 29.3 | $R_1=+241.185$ | $t=2.60$ |
|    |       |      | $R_2=+10.85$   |          |
| III | 1.617 | 54.9 | $R_1=+10.85$   | $t=3.50$ |
|     |       |      | $R_2=-15.911$  |          | in which the microscope objective has a power of ten and a numeral aperture of 0.25.

2. The system according to claim 1 wherein said telescope objective comprises an air separated doublet IV, V according to the following in which $s$ is the distance between lenses IV and V in millimeters:

| Lens | $n_D$ | $v$ | Radii | Thickness and Distance |
|---|---|---|---|---|
| IV | 1.5725 | 57.4 | $r_1=+112.702$ | $t=2.53$ |
|  |  |  | $r_2=-72.305$ |  |
| V | 1.5795 | 41.0 | $r_1=+44.201$ | $s=.258$ |
|  |  |  | $r_2=+27.735$ | $t=2.37$ | in which the separation between the microscope objective and telescope objective is variable in the order of 100 millimeters.

3. An optical system for microscopes comprising an eyepiece, a microscope objective aligned with said eyepiece to image an object toward the eyepiece, and a telescope objective interposed between the microscope objective and the eyepiece to focus the image in the focal plane of the latter said telescope objective and said eyepiece being fixed relative to each other and said microscope objective being movable relative thereto for focusing the system upon an object, said telescope objective comprising an air separated doublet IV, V according to the following in which $s$ is the distance between lenses IV and V in millimeters:

| Lens | $n_D$ | $v$ | Radii | Thickness and Distance |
|---|---|---|---|---|
| IV | 1.5725 | 57.4 | $r_1=+112.702$ | $t=2.53$ |
|  |  |  | $r_2=-72.305$ |  |
| V | 1.5795 | 41.0 | $r_1=+44.201$ | $s=.258$ |
|  |  |  | $r_2=+27.735$ | $t=2.37$ | in which the separation between the microscope objective and telescope objective is variable in the order of 100 millimeters.

4. An optical system for microscopes comprising an eyepiece, a microscope objective aligned with said eyepiece to image an object toward the eyepiece, and a telescope objective interposed between the microscope objective and the eyepiece to focus the image in the focal plane of the latter said telescope objective and said eyepiece being fixed relative to each other and said microscope objective being movable relative thereto for focusing the system upon an object, said telescope objective comprising an air separated doublet IV, V according to the following in which $s$ is the distance between lenses IV and V in millimeters:

| Lens | $n_D$ | $v$ | Radii | Thickness and Distance |
|---|---|---|---|---|
| IV | 1.5725 | 57.4 | $r_1=+112.702$ | $t=2.53$ |
|  |  |  | $r_2=-72.305$ |  |
| V | 1.5795 | 41.0 | $r_1=+44.201$ | $s=.258$ |
|  |  |  | $r_2=+27.735$ | $t=2.37$ | in which the separation between the microscope objective and telescope objective is variable in the order of 100 millimeters.

5. In a compound microscope, the combination of a microscope objective and a telescope objective in which the telescope objective is characterized by predetermined axial aberration compensating for inherent field aberration of the microscope objective, said telescope objective comprising an air separated doublet IV, V according to the following in which $s$ represents the separation between lenses IV and V in millimeters, $n_D$ the refractive index and $v$ the abbe number, the radii being in millimeters:

| Lens | $n_D$ | $v$ | Radii | Thickness and Distance |
|---|---|---|---|---|
| IV | 1.5725 | 57.4 | $r_1=+112.702$ | $t=2.53$ |
|  |  |  | $r_2=-72.305$ |  |
| V | 1.5795 | 41.0 | $r_1=+44.201$ | $s=.258$ |
|  |  |  | $r_2=+27.735$ | $t=2.37$ | in which the microscope objective and telescope objective are relatively distantly spaced.

6. The microscope according to claim 5 wherein the microscope objective is 10× with a numerical aperture of 0.25 consisting of a single lens I followed by a cemented doublet II, III, as follows:

| Lens | $n_D$ | $v$ | Radii | Thickness and Distance |
|---|---|---|---|---|
| I | 1.617 | 54.9 | $R_1=-120.296$ | $t=3.15$ |
|  |  |  | $R_2=-11.90$ |  |
| II | 1.720 | 29.3 | $R_1=+241.185$ | $s=7.533$ |
|  |  |  | $R_2=+10.85$ | $t=2.60$ |
| III | 1.617 | 54.9 | $R_1=+10.85$ | $t=3.50$ |
|  |  |  | $R_2=-15.911$ |  |

7. The microscope according to claim 5 wherein the microscope objective is a single lens I followed by a cemented doublet II, III, the objective being of 40 power, as follows:

| Lens | $n_D$ | $v$ | Radii | Thickness and Distance |
|---|---|---|---|---|
| I | 1.617 | 54.9 | $R_1=\infty$ | $t=3.40$ |
|  |  |  | $R_2=-2.98$ |  |
| II | 1.7506 | 27.8 | $R_1=+19.01$ | $s=.63$ |
|  |  |  | $R_2=+3.52$ | $t=.81$ |
| III | 1.6109 | 57.2 | $R_1=+3.52$ | $t=2.58$ |
|  |  |  | $R_2=-6.61$ |  |

8. The microscope according to claim 5 wherein the microscope objective is of 43× having a numerical aperture of 0.66 and comprises a single lens VIII followed by a first cemented doublet IX, X and a second cemented doublet XI, XII as follows:

| Lens | $n_D$ | $v$ | Radii | Thickness and Distance |
|---|---|---|---|---|
| VIII | 1.5725 | 57.4 | $R_1=\infty$ | $t=2.750$ |
|  |  |  | $R_2=-2.85$ |  |
| IX | 1.5795 | 41.0 | $R_1=\infty$ | $s=.956$ |
|  |  |  | $R_2=+12.83$ | $t=1.00$ |
| X | 1.511 | 63.5 | $R_1=+12.83$ | $t=1.51$ |
|  |  |  | $R_2=-6.23$ |  |
| XI | 1.720 | 29.3 | $R_1=+14.07$ | $s=.084$ |
|  |  |  | $R_2=+4.30$ | $t=.98$ |
| XII | 1.5170 | 64.5 | $R_1=+4.30$ | $t=2.31$ |
|  |  |  | $R_2=-13.31$ |  |

9. The microscope according to claim 5 wherein the microscope objective is oil immersed having a numerical aperture of 1.25 and comprises a single lens I, followed by a single lens II, followed by a cemented doublet III, IV, followed by a cemented doublet V, VI, as follows:

| Lens | $n_D$ | $v$ | Radii | Thickness and Distance |
|------|-------|-----|-------|------------------------|
| I    | 1.5170 | 64.5 | $R_1=\infty$ $R_2=-.816$ | $t=.98$ $s=.02$ |
| II   | 1.5110 | 63.5 | $R_1=-8.16$ $R_2=-2.04$ | $t=1.00$ $s=.382$ |
| III  | 1.6490 | 33.8 | $R_1=-26.28$ $R_2=+5.980$ | $t=.69$ |
| IV   | 1.5110 | 63.5 | $R_1=+5.98$ $R_2=-3.78$ | $t=1.54$ $s=.182$ |
| V    | 1.720  | 29.3 | $R_1=+88.71$ $R_2=+4.516$ | $t=.55$ |
| VI   | 1.5110 | 63.5 | $R_1=+4.516$ $R_2=-8.165$ | $t=1.60$ |

10. An optical system for microscopes comprising an eyepiece, a microscope objective aligned with said eyepiece to image an object toward the eyepiece, and a telescope objective interposed between the microscope objective and the eyepiece to focus the image in the focal plane of the latter said telescope objective and said eyepiece being fixed relative to each other and said microscope objective being movable relative thereto for focusing the system upon an object, said microscope objective being of 4× and comprising a pair of air spaced lenses I and II, according to the following in which $n_D$ is the index of refraction, $v$ is the Abbe number and $s$ represents the spacing between the lens elements in millimeters, the radii and thickness being indicated in millimeters:

| Lens | $n_D$ | $v$ | Radii | Thickness and Distance |
|------|-------|-----|-------|------------------------|
| I    | 1.649 | 33.8 | $R_1=+254.0$ $R_2=+12.570$ | $t=1.0$ $s=1.25$ |
| II   | 1.517 | 64.5 | $R_1=+14.97$ $R_2=-14.97$ | $t=3.0$ |

11. In a microscope including an eyepiece and a microscope objective in which the microscope objective is movable for focusing purposes, a telescope objective interposed optically between the eyepiece and microscope objective and fixed relative to said eyepiece, said telescope objective being in the form of an air separated doublet characterized by undercorrection for axial color and wherein comatic and spherical aberrations are controlled to compensate inherent undercorrection for tangential curvature of field in the microscope objective, the front lens of said doublet satisfying the relationship $$+.304 > \frac{r_2+r_1}{r_2-r_1} > -.218$$

and the other lens of the doublet satisfying the relationship $$-4.369 > \frac{r_2+r_1}{r_2-r_1} > -5.937$$

12. In a microscope including an eyepiece and a microscope objective in which the microscope objective is movable for focusing purposes, a telescope objective interposed optically between the eyepiece and microscope objective and fixed relative to said eyepiece, said telescope objective being in the form of an air separated doublet characterized by undercorrection for axial color and wherein comatic and spherical aberrations are controlled to compensate inherent undercorrection for tangential curvature of field in the microscope objective, the front lens of said doublet having a shape factor $$\frac{r_2+r_1}{r_2-r_1}$$

ranging from about $-.2$ to about $-.4$, the other lens of said doublet having a shape factor ranging from about $-6$ to about $-4$.

13. In a microscope including an eyepiece and a microscope objective in which the microscope objective is movable for focusing purposes, a telescope objective interposed optically between the eyepiece and microscope objective and fixed relative to said eyepiece, said telescope objective being in the form of an air separated doublet characterized by undercorrection for axial color and wherein comatic and spherical aberrations are controlled to compensate inherent undercorrection for tangential curvature of field in the microscope objective, said doublet comprising lenses IV and V according to the following in which $n_D$ is the index of refraction, $v$ is the abbe number and $f$ is the equivalent focal length of the telescope objective:

| Lens | $n_D$ | $v$ | Radii |
|------|-------|-----|-------|
| IV   | 1.5725 | 57.4 | $r_1=+.682f$ $r_2=-.438f$ |
| V    | 1.5795 | 41.0 | $r_3=+.267f$ $r_4=+.167f$ |

14. In a microscope including an eyepiece and a microscope objective in which the microscope objective is movable for focusing purposes, a telescope objective interposed optically between the eyepiece and microscope objective and fixed relative to said eyepiece, said telescope objective being in the form of an air separated doublet characterized by undercorrection for axial color and wherein comatic and spherical aberrations are controlled to compensate inherent undercorrection for tangential curvature of field in the microscope objective, said doublet comprising lenses IV and V according to the following in which $n_D$ is the index of refraction, $v$ is the abbe number and $f$ is the equivalent focal length of the telescope objective:

| Lens | $n_D$ | $v$ | Radii |
|------|-------|-----|-------|
| IV   | 1.5725 | 57.4 | $r_1=+.478f$ $r_2=-.897f$ |
| V    | 1.5795 | 41.0 | $r_3=+.247f$ $r_4=+.176f$ |

15. In an optical system for microscopes, the combination of a telescope objective characterized by deliberately introduced axial color and at least one other axial aberration such as coma, spherical aberration, and the combination of coma and spherical aberration, and a microscope objective optically aligned with said telescope objective, said microscope objective being inherently afflicted both with lateral color and with tangential curvature of field and being characterized both by deliberately introduced axial color and by deliberately introduced axial aberration of the same kind as the other axial aberration deliberately introduced in the telescope objective, the axial aberrations deliberately introduced in the microscope objective being opposite in sign and substantially equal to the corresponding axial aberrations deliberately introduced in the telescope objective, said telescope objective being spaced from said microscope objective by an amount sufficient to permit the deliberately introduced axial aberrations of the telescope objective to substantially cancel, for the telescope objective-microscope objective combination, the inherent lateral color and tangential curvature of field contributions of the microscope objective while also leaving the said combination well corrected both for axial color and the stated other axial aberration.

16. An optical system for microscopes, comprising the combination of an eyepiece, a microscope objective optically aligned with said eyepiece and axially movable relative thereto for focusing purposes, said microscope objective imaging an object, upon which it is focused, at infinity, and a telescope objective interposed, in optical alignment, between said eyepiece and said microscope objective and fixed relative to said eyepiece for focusing the aforesaid image produced by said microscope objective in the focal plane of said eyepiece, said telescope objective being characterized by at least one deliberately introduced axial abberation such as axial color, coma, spherical aberration, and the combination of coma and spherical aberration, said microscope objective being afflicted with at least one inherent field aberration such as lateral color, and tangential curvature of field, and being characterized by deliberately introduced axial aberration of the same kind as the axial aberration deliberately introduced in the telescope objective, the axial aberration deliberately introduced in the microscope objective being opposite in sign and substantially equal to the axial aberration deliberately introduced in the telescope objective, said telescope objective being spaced from said microscope objective by an amount sufficient to cooperate with the kind and amount of the axial aberration deliberately introduced in the telescope objective to substantially cancel, for the telescope objective-microscope objective combination, said inherent field aberration of the microscope objective while also leaving the said combination well corrected for axial aberration of the kind deliberately introduced as aforesaid.

17. In an optical system as defined in claim 15 wherein said other axial aberration deliberately introduced in said telescope objective is coma.

18. In an optical system as defined in claim 15 wherein said other axial aberration deliberately introduced in said telescope objective is spherical aberration.

19. In an optical system as defined in claim 15 wherein said telescope objective consists of an air separated doublet in which the shape factors and air separation of the doublet are used to introduce spherical aberration, while holding coma substantially zero, as said other axial aberration deliberately introduced in the telescope objective.

20. The optical system according to claim 16 wherein the inherent field aberration of the microscope objective is tangential curvature of field and the axial aberration deliberately introduced in the telescope objective is coma.

21. The optical system according to claim 16 wherein the inherent field aberration of the microscope objective is tangential curvature of field and the axial aberration deliberately introduced in the telescope objective is spherical aberration.

22. The optical system according to claim 21 wherein said telescope objective consists of an air separated doublet in which the shape factors and air separation of the doublet are used to introduce the spherical aberration while holding coma substantially zero.

23. The optical system according to claim 16 wherein the inherent field aberration of the microscope objective is lateral color and the axial aberration deliberately introduced in the telescope objective is axial color.

References Cited in the file of this patent

UNITED STATES PATENTS

| | | |
|---|---|---|
| 1,649,068 | Kohler | Nov. 15, 1927 |
| 2,237,943 | Lihotzky | Apr. 8, 1941 |
| 2,439,526 | Ott | Apr. 13, 1948 |
| 2,791,937 | Leitz et al. | May 14, 1957 |

FOREIGN PATENTS

| | | |
|---|---|---|
| 163,137 | Austria | Oct. 15, 1948 |